United States Patent [19]
Powell

[11] Patent Number: 5,570,670
[45] Date of Patent: Nov. 5, 1996

[54] TWO STROKE INTERNAL COMBUSTION ENGINE

[76] Inventor: Brian L. Powell, Kalandan, 2630 Peak View, New South Wales, Australia

[21] Appl. No.: 571,125

[22] Filed: Dec. 12, 1995

Related U.S. Application Data

[63] Continuation-in-part of Ser. No. 211,140, filed as PCT/AU92/00507, Sep. 23, 1992, abandoned.

[30] Foreign Application Priority Data

Sep. 23, 1991 [AU] Australia .................. PK8492

[51] Int. Cl.⁶ ...................... F02B 17/00; F02B 19/12
[52] U.S. Cl. .............................. 123/256; 123/257
[58] Field of Search .................... 123/257, 256, 123/262, 51 B

[56] References Cited

U.S. PATENT DOCUMENTS

| | | | |
|---|---|---|---|
| 1,579,664 | 4/1926 | Scott | 123/51 B |
| 1,599,354 | 9/1926 | Arnold | 123/257 |
| 2,119,219 | 5/1938 | Ruth | 123/256 |
| 2,244,453 | 6/1941 | Fottinger et al. | 123/65 PD |
| 2,285,671 | 6/1942 | Mallory | 123/257 |
| 2,884,913 | 5/1959 | Heintz | 123/275 |
| 3,113,561 | 12/1963 | Heintz | 123/257 |
| 3,924,582 | 12/1975 | Yagi et al. | 123/256 |
| 3,976,038 | 8/1976 | Stahl | 123/257 |

FOREIGN PATENT DOCUMENTS 661957 3/1929 France.

*Primary Examiner*—Andrew M. Dolinar
*Attorney, Agent, or Firm*—Kane, Dalsimer, Sullivan, Kurucz, Levy, Eisele & Richard, LLP

[57] ABSTRACT

A two stroke internal combustion engine has two opposed pistons (8) which reciprocate in opposite directions in cylinder (4) and define a common compression chamber (6) therebetween. Blower (10) supplies scavenging air at high pressure to compression chamber (6) through inlet port(s) (15) to pass axially through compression chamber (6) to exhaust port(s) (7) in an amount sufficient to purge substantially all products of combustion from compression chamber (6) and to cool cylinder (4). A small external combustion chamber (3), having restricted communication (9) with compression chamber (6), has a valve (2) permitting injection of a rich fuel/air mixture which in part passes to compression chamber (6) to form a fuel lean mixture with the scavenging air therein. Ignition means (1) ignites the fuel rich mixture in combustion chamber (3), in turn allowing burning fuel to ignite the fuel lean mixture in compression chamber (6). The arrangement is such that the operating temperatures in compression chamber (6) remain sufficiently low (below 1650 degrees Celsius) to substantially prevent the formation of nitrogen oxides therein.

11 Claims, 4 Drawing Sheets

TWO STROKE INTERNAL COMBUSTION ENGINE

The present application is a Continuation-In-Part application of my application Ser. No. 08/211140 which was filed on 22 Mar. 1994, now abandoned, and which was derived from PCT/AU92/00507 having an International Filing Date of 23 Sep. 1992.

FIELD OF INVENTION

The invention relates to an internal combustion engine which operates in accordance with a two stroke cycle. In particular, the invention is concerned with an engine having a cylinder housing two opposed pistons arranged to reciprocate in opposite directions along the longitudinal axis of the cylinder, the pistons defining a common compression chamber therebetween. The invention is applicable to a two stroke internal combustion engine having each piston connected to a conventional crankshaft and connecting rod as well as to crankless engines.

BACKGROUND OF INVENTION

Although two stroke internal combustion engines have been known for more than a century, they still have significant drawbacks and they have had limited application. There are heating problems normally experienced with two stroke internal combustion engines. Furthermore, the exhaust emissions from such engines include several atmospheric pollutants such as carbon monoxide, hydrocarbons and nitrogen oxides.

Carbon monoxide is a colourless, odourless, poisonous gas, slightly lighter than air. The presence of this noxious gas in exhaust emissions is the result of incomplete combustion of fuel with the carbon partly oxidized to carbon monoxide instead of being fully oxidized to carbon dioxide. This is due to insufficient oxygen in the combustion chamber. Most conventional combustion chambers respond adversely to over-supply of oxygen or to a "lean mixture" as it is normally called.

The presence of hydrocarbons in exhaust emissions also represents unburned and wasted fuel. Generally, the percentage of hydrocarbons is high in emissions from two stroke engines and this is particularly due to the nature in which the engines are scavenged. Although gaseous hydrocarbons at concentrations normally found in the atmosphere are not toxic, they are a major pollutant because of their role in forming photochemical smog.

Nitrogen oxides are produced when fuel is burned at very high temperatures in the presence of oxygen. Nitrogen oxides combine with hydrocarbons to form a complex variety of secondary pollutants called photochemical oxidants which contribute to the formation of smog. The presence of nitrogen oxides in exhaust emissions has become a major problem in all conventional two stroke internal combustion engines, particularly where efforts have been made to reduce carbon monoxide by burning lean mixtures. Some experimental units have been successful in burning lean mixtures, but the excess oxygen in the combustion chamber converts to nitrogen oxides, which in the past have only been able to be removed by installing an expensive catalytic converter.

Among the oxides of nitrogen forming air pollutants, nitric oxide (NO) and nitrogen dioxide ($NO_2$) occur most frequently. Nitric oxide is a colourless, toxic gas formed from nitrogen and oxygen at high temperatures. It converts to nitrogen dioxide, an irritant and poison, in the exhaust of an internal combustion engine.

The formation of nitrogen oxides is a result of excess oxygen, combustion chamber temperatures above 1650 degrees Celsius and the dwell period of the piston at top dead center. The dwell period cannot be reduced in a conventional crankshaft engine. However, it has been found that if the zone of high temperature (i.e. above 1650 degrees Celsius) is removed from the location of excess oxygen, the generation of nitrogen oxides is substantially prevented.

DESCRIPTION OF THE PRIOR ART

It has been known for some time that the use of charge stratification in internal combustion engines results in improved fuel economy and reduced toxic emissions.

For example, U.S. Pat. No. 3,113,561 (Heintz) discloses a stratified 2-cycle engine which is stated to achieve substantially complete combustion of fuel under all operating conditions, an exceptional fuel economy and a reduction of contamination to the atmosphere by irritating and noxious products of partial combustion, i.e. smog. The engine has air inlet and exhaust ports in the cylinder walls. In addition, it is provided in the cylinder head with an auxiliary charging and ignition chamber which is connected via an off-centre curved passage to the compression chamber thereby imparting a rapid swirl to gases passing therealong. Air and fuel are supplied to the ignition chamber and mixture is ignited therein and expands into the compression chamber where combustion is completed.

When the engine is idling or operating at reduced power, the amount of air supplied through the inlet port in the cylinder walls is practically negligible. Air is supplied to the auxiliary chamber when the engine is idling and the amount is progressively increased as the power is increased. The amount of fresh air so introduced fills less than one third of the cylinder. During idling and low-power operation, the remaining space within the cylinder is filled with retained hot exhaust gases which when highly compressed are still further heated whereby the combustion temperature is kept high even during idling. The undesirable flame-quenching action, which results from a large excess of cold, fresh air, resulting in incomplete combustion and the copious production of noxious fumes is largely eliminated by the described retention of exhaust gases. From idling to about a third peak power, all air is supplied through the auxiliary chamber. As power is further increased by increasing the fuel supply, additional air is supplied through the inlet port in the cylinder walls thereby expelling more exhaust gases through the exhaust port. The temperature of combustion remains high.

There is no suggestion that the operating temperatures in the compression chamber are kept sufficiently low to substantially prevent the formation of nitrogen oxides. On the contrary, the Heintz engine operates at high temperatures during idling, low-power, and high-power.

U.S. Pat. No. 3,976,038 (Stahl) states that it was known that considerably reduced emission of pollutants in the exhaust gases, especially carbon monoxide and nitrogen oxides, are achieved by stratified charged engines employing spark ignition as compared with engines which operate with a homogenous fuel-air mixture. This is stated to be due to the lower combustion temperatures and to the more perfect combustion resulting from the use of excess air.

Stahl describes the application of charge stratification to a two cycle internal combustion engine which operates with through-flow scavenging and a scavenging pump. The engine includes a piston adapted to reciprocate in a cylinder and a combustion chamber in the cylinder head. The combustion chamber is divided into an intake section and an exhaust section, which are interconnected by a passage of restricted cross-section. The intake section may be located wholly or partly over the cylinder, or entirely beyond it, depending on the amount of excess air desired in the intake section. The intake section encompasses an intake valve and spark plug so that, on induction of a fuel-air mixture into the intake section, an enriched mixture is established adjacent the spark plug. It is stated that the configuration of the combustion chamber substantially reduces the exchange of charge between the intake section and the exhaust section during the compression stroke, thus maintaining the charge stratification required. Air for the fuel mixture and for scavenging may be admitted through the intake valve or an additional intake valve for pure scavenging air may be provided. A fuel injector is located in the intake duct immediately upstream of the intake port and fuel injection commences no sooner that the beginning of the second half of the scavenging period and terminates no later than the end of the scavenging period. An exhaust port, which is opened and closed by movement of the piston, is located at the other end of the cylinder.

Stahl does not propose two zones of significant temperature difference. He does not mention supplying scavenging air at high pressure to cool the cylinder. He does not suggest that the operating temperatures in the compression chamber should remain sufficiently low to substantially prevent the formation of nitrogen oxides.

In my U.S. Pat. No. 5,031,581, there is described a two stroke internal combustion engine employing charge stratification for improved fuel economy and reduced toxic emissions. The engine includes a cylinder wherein a pair of opposed pistons are mounted for reciprocation in opposite directions along its longitudinal axis, the pistons defining a common compression chamber therebetween. Mounted outside the cylinder but adjacent thereto is an ignition chamber having an orifice in communication with the compression chamber. A fuel rich mix supplied to the ignition chamber in part passes through the orifice to form a fuel lean mix with air trapped between the pistons. Ignition of the fuel rich mix in the ignition chamber in turn ignites the fuel lean mix trapped between the pistons. Although this construction achieves reduced emissions, attention needs to be given to the formation of nitrogen oxides.

DESCRIPTION OF THE INVENTION

It is an object of the invention to minimise harmful emissions from a two stroke internal combustion engine.

It is also an object of the invention to minimise the heating problems normally associated with known two stroke internal combustion engines.

It is a further object of the invention to keep the temperatures in the compression chamber sufficiently low to substantially prevent the formation of nitrogen oxides therein.

The invention proposes a two stroke internal combustion engine having a cylinder, two opposed pistons in the cylinder arranged to reciprocate in opposite directions along the longitudinal axis thereof, the pistons defining a common compression chamber therebetween, at least one inlet port located adjacent one end of the cylinder and communicating with the compression chamber, at least one exhaust port located adjacent the other end of the cylinder for discharge of scavenging air and products of combustion from the compression chamber, means to supply scavenging air at high pressure to the compression chamber through the inlet port(s) to pass axially through the compression chamber to the exhaust port(s) in an amount sufficient to purge substantially all products of combustion from the compression chamber and to cool the cylinder, a small combustion chamber external to the cylinder and spaced from the compression chamber but having restricted communication therewith, means to inject into the combustion chamber a rich fuel/air mixture which in part passes to the compression chamber to form a fuel lean mixture with the scavenging air therein, and ignition means mounted in the combustion chamber to ignite the fuel rich mixture therein, in turn allowing burning fuel to ignite the fuel lean mixture in the compression chamber, the arrangement being such that in operation the temperatures in the compression chamber remain sufficiently low to substantially prevent the formation of nitrogen oxides therein.

Not only is the formation of nitrogen oxides substantially prevented, there is substantially complete combustion of fuel due to the abundance of oxygen in the compression chamber thus minimising the emission of carbon monoxide and hydrocarbons. The high volume of scavenging air passing through the compression chamber is sufficient both to effectively purge and cool the cylinder. Because of the division of fuel between a fuel rich mixture in the small combustion chamber and a fuel lean mixture in the combustion chamber, significant fuel economy characterises the two stroke internal combustion engine of the invention.

BRIEF DESCRIPTION OF THE DRAWINGS

The invention is described with reference to the accompanying drawings which illustrate two embodiments of a two stroke internal combustion engine according to the invention. In the drawings.

DETAILED DESCRIPTION OF THE EMBODIMENTS

Figure 1:
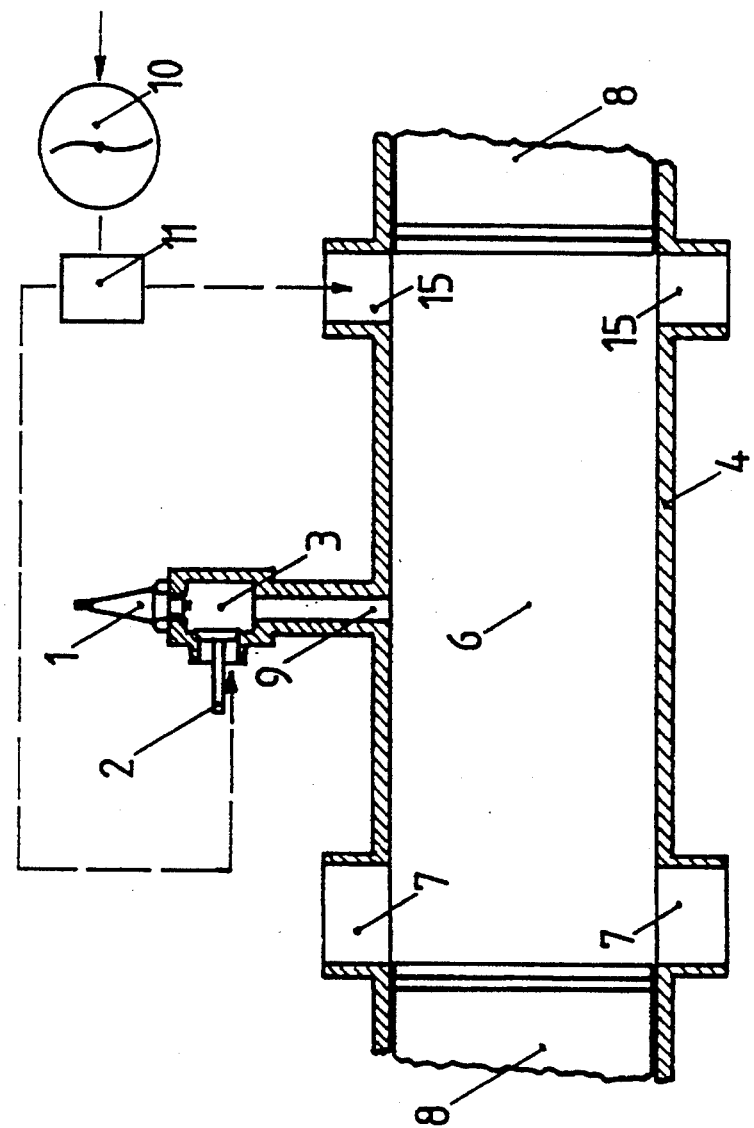
FIG. 1 is a sectional view of a cylinder housing two opposed pistons, the cylinder being connected to a separate external combustion chamber, according to one embodiment of the invention.
Figure 4:
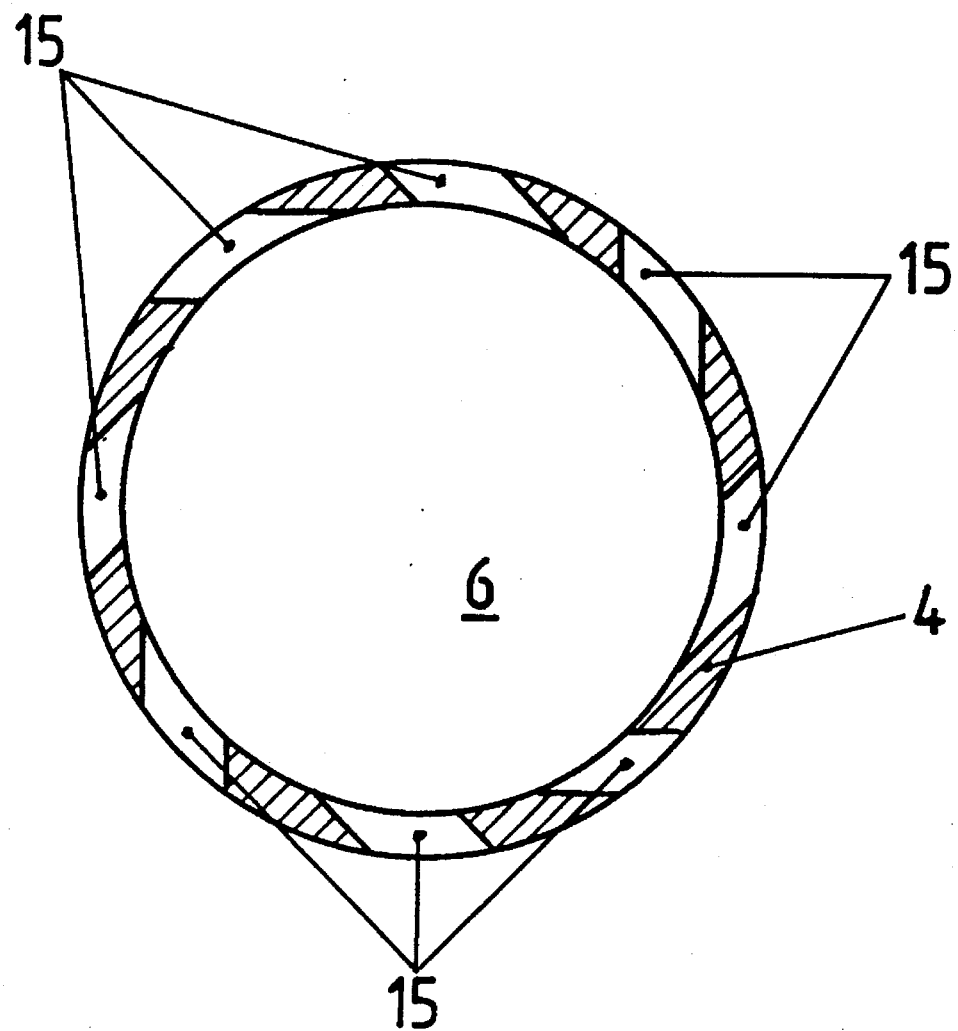
FIG. 4 is another sectional view at right angles to FIG. 1 and FIG. 2.

The two stroke internal combustion engine illustrated in FIG. 1 comprises a cylinder 4 having two horizontally opposed pistons 8 arranged to reciprocate in opposite directions along the longitudinal axis of cylinder 4 defining a common compression chamber 6 therebetween. Each piston 8 is connected to a conventional connecting rod and crankshaft (not shown). At one end of cylinder 4, there is provided through the cylinder wall a plurality of inlet ports 15 spaced around the circumference of the cylinder for admission of scavenging air to compression chamber 6. As shown in FIG. 4, inlet ports 15 are angled so that scavenging air enters compression chamber 6 in a substantially tangential direction to produce a swirling movement of the scavenging air therein. At the other end of cylinder 4 there is provided through the cylinder wall a plurality of exhaust ports 7 spaced around the circumference of the cylinder for discharge of scavenging air and products of combustion from compression chamber 6. Opening and closing of inlet ports 15 and exhaust ports 7 is effected by pistons 8 as they reciprocate in cylinder 4. The ports are so arranged that, on the compression stroke, inlet ports 15 close just before exhaust ports 7 and, on the expansion stroke, exhaust ports 7 open just before inlet ports 15.

Figure 3:
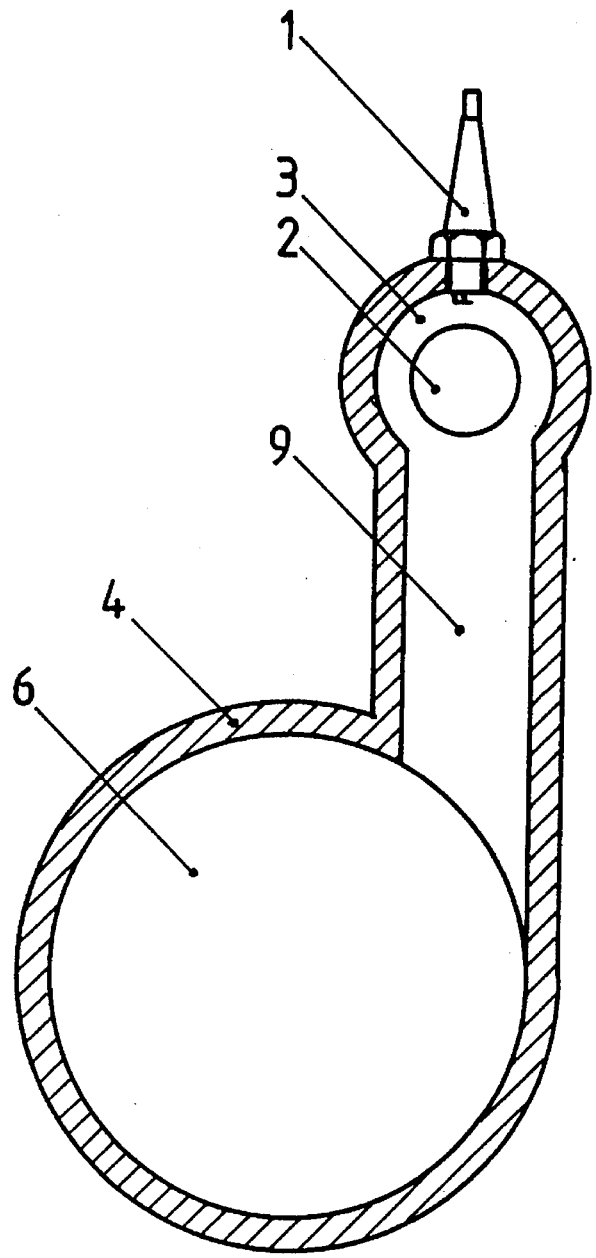
FIG. 3 is a sectional view at right angles to FIG. 1.

Disposed adjacent to the external wall of cylinder 4 is a small separate external combustion chamber 3. By being described herein as "external" is meant that combustion chamber 3 is located completely outside cylinder 4, including outside cylinder heads, walls and other parts of the cylinder assembly. The purpose of this arrangement is to insulate as much as possible the temperatures in combustion chamber 3 and compression chamber 6. Combustion chamber 3 is spaced from compression chamber 6 but has restricted communication therewith along a narrow passage 9. As shown in FIG.3, passage 9 is offset so that it enters compression chamber 6 in a substantially tangential direction.

Spark plug 1 is mounted on the external combustion chamber 3 for ignition of fuel/air mixture therein. The fuel/air mixture is injected into combustion chamber 3 through an inlet port controlled by poppet valve 2. As hereinafter described, air for the fuel/air mixture is supplied by a blower.

A blast of high pressure scavenging air is forced into compression chamber 6 through inlet ports 15. Scavenging air together with products of combustion exit compression chamber 6 by way of exhaust ports 7. To supply a large volume of high pressure scavenging air, an external blower 10 is provided. The same blower may be used to supply air via control valve 11 for the fuel mix as well as air for scavenging purposes, and, if desired for supercharging. The blower may be driven by the engine and, if desired, may be turbo exhaust assisted. The provision of a large charge of high pressure air insures an adequate throughput of scavenging air to not only purge the compression chamber but also to cool the cylinder. Effective cooling is due in part to the fact that the scavenging air moves at a high velocity in a substantially spiral path down the internal wall of compression chamber 6.

The inlet port 2 for the air/fuel mixture is relatively small in comparison with the other ports. Preferably, the inlet ports 15 for the scavenging air and the exhaust ports 7 are larger than those employed in conventional engines of the same size. Larger air inlet and exhaust ports facilitate the supply of an adequate throughput of scavenging air. Preferably, there are a plurality of inlet and exhaust ports spaced around the circumference of the cylinder.

The engine operates throughout a complete two stroke cycle in the following manner. It is assumed that the cycle commences with pistons 8 at bottom dead centre. Poppet valve 2 would be open admitting air to scavenge combustion chamber 3 and passage 9 with the scavenged gases therefrom flowing into compression chamber 6 and out exhaust ports 7. Pistons 8 commence to move towards each other in cylinder 4. Inlet ports 15 are closed shutting off the ingress of scavenging air just before exhaust ports 7 close. Compression chamber 6 would then be filled with substantially clean air.

While poppet valve 2 is open, a slightly rich fuel/air mixture is injected into the external combustion chamber 3. In order to prevent any fuel from escaping to the atmosphere during scavenging, injection takes place just before piston 8 closes exhaust ports 7. The fuel/air charge in part proceeds from external combustion chamber 3, along passage 9 and into compression chamber 6. The substantially tangential disposition of passage 9 as shown in FIG. 3 is arranged so that the charge enters compression chamber 6 in the same direction as the swirling movement of the air therein and is dispersed thereby. The amount of charge allowed to enter compression chamber 6 depends on the power and revolutions required during the operation of the engine. However, exhaust ports 7 are closed before the fuel mixture is able to move to that point in compression chamber 6. In any event, it is not necessary for the fuel mixture to move more than about half way along the cylinder towards the exhaust ports as the only purpose for entry of fuel into compression chamber 6 is to undergo dilution with the remaining scavenging air in order to provide a lean mix. The lean mix with excess oxygen in compression chamber 6 promotes complete combustion of all fuel. If a supercharge is required, poppet valve 2 must remain open for admission of air until a piston 8 has completely shut off exhaust ports 7.

After poppet valve 2 closes, pistons 8 continue to move together in cylinder 4 on the compression stroke. The air is compressed in compression chamber 6, passage 9 and combustion chamber 3. However, the dimensions of passage 9 are such that the fuel/air mix adjacent to spark plug 1 remains sufficiently rich for it to be ignited by spark with a consequent explosion which forces burning fuel along passage 9 into compression chamber 6. The remaining charge, having been made lean by mixing with scavenging air, is ignited by the burning of the richer charge and burns without detonation. As the burning fuel is forced into compression chamber 6 in the same direction as the swirling movement of the air therein, the velocity of the air movement is increased and burning is promoted.

The relationship of combustion chamber 3 and compression chamber 6 is such that two separate zones with a significant temperature difference result. In the first place, a high temperature zone is produced near the centre of explosion in combustion chamber 3. Secondly, there is a zone of significantly lower temperature in compression chamber 6. As a consequence, there is effective separation of the high temperature zone in combustion chamber 3 and the excess oxygen from the leaner mix in compression chamber 6. The temperature of the burning excess oxygen is sufficiently low, i.e. below 1650 Celsius, to substantially prevent formation of nitrogen oxides. Furthermore, due to the excess oxygen, substantially complete combustion is achieved resulting in the absence of carbon monoxide and hydrocarbons from the exhaust emissions. Another consequence is that reciprocation of pistons 8 in cylinder 4 is a relatively cool operation so that the engine avoids the traditional heating problems normally associated with two stroke engines.

The power stroke then follows with blowdown taking place as a piston 8 exposes exhaust ports 7. Inlet valves 15 then open and scavenging air is forced into compression chamber 6 to fully purge it with clean air and to cool cylinder 4.

An advantage of this engine is that the exhaust ports 7 may be unrestricted around the circumference of cylinder 4. This is due to the absence of transfer ports, which are required at the exhaust ports of most conventional two stroke engines, but are not necessary with the present design. This allows for more efficient breathing.

The present system also allows conventional two stroke engines to operate with a wet oil sump lubrication as lubrication oil is not required in the fuel. This permits engine sizes to compete with four stroke engines.

The two stroke engines described may be adapted to employ any one of a wide range of fuels such as petrol, gas and diesel oil and no particular additives are required.

Figure 2:
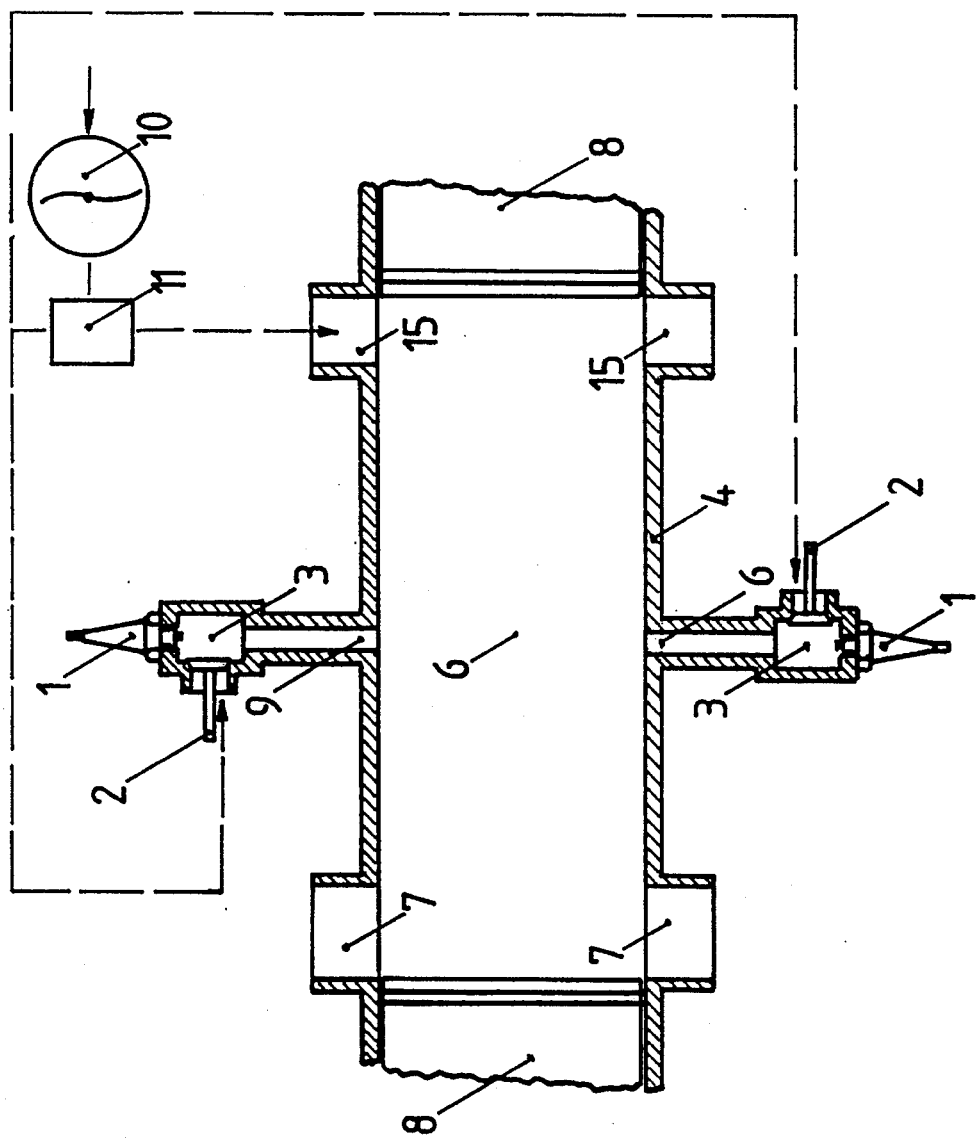
FIG. 2 is a sectional view similar to FIG. 1 but having two separate external combustion chambers according to a second embodiment of the invention.

In the engine described in FIG. 1, more than one external combustion chamber 3 may be provided, particularly in the case of large engines. The combustion chambers 3, each with a passage 9, may be spaced around compression chamber 6. An engine with two external combustion chambers 3 is illustrated in FIG. 2.

In a further embodiment, compression chamber 6 may be provided with a large exhaust port controlled by a poppet valve so that the other ports in the compression chamber 6 would be arranged to function as inlet ports for scavenging air.

As previously described, the substantially tangential disposition of passage 9 as shown in FIG. 3 is arranged so that the fuel charge enters compression chamber 6 in the same direction as the swirling movement of the air therein and is dispersed thereby. This would generally be the case. However, for certain capacity engines, it may be necessary for the fuel charge to enter compression chamber 6 in opposition to the direction of swirl to dampen excessive swirling movement of the air. In that case, there would still be effective dispersion of the fuel charge.

In another modification, the exterior surface of cylinder 4 may be provided with radiation fins to assist cooling. Further, engines may employ more than one cylinder 4. Instead of conventional crankshafts and connecting rods, the engine may be a crankless engine of the type described in my U.S. Pat. No. 5,031,581.

I claim:

1. A two stroke internal combustion engine comprising a cylinder, two opposed pistons within the cylinder arranged to reciprocate in opposite directions along the longitudinal axis thereof, the pistons defining a common compression chamber therebetween, at least one inlet port located adjacent one end of the cylinder and communicating with the compression chamber, at least one exhaust port located adjacent the other end of the cylinder for discharge of scavenging air and products of combustion from the compression chamber, means to supply scavenging air at high pressure to the compression chamber through the inlet port(s) to pass axially through the compression chamber to the exhaust port(s) in an amount sufficient to purge substantially all products of combustion from the compression chamber and to cool the cylinder, a small combustion chamber external to the cylinder and spaced from the compression chamber but having restricted communication therewith, means to inject into the combustion chamber a rich fuel/air mixture which in part passes to the compression chamber to form a fuel lean mixture with the scavenging air therein, and ignition means mounted in the combustion chamber to ignite the fuel rich mixture therein, in turn allowing burning fuel to ignite the fuel lean mixture in the compression chamber, the arrangement being such that in operation the temperatures in the compression chamber remain sufficiently low to substantially prevent the formation of nitrogen oxides therein.

2. An engine as claimed in claim 1, wherein the inlet and exhaust ports are opened and closed by movement of the pistons as they reciprocate in the cylinder.

3. An engine as claimed in claim 1, wherein each air inlet port is designed to cause swirling movement of scavenging air in the compression chamber.

4. An engine as claimed in claim 3, wherein each air inlet port is disposed angularly so that air enters the compression chamber in a substantially tangential direction to produce the swirling movement.

5. An engine as claimed in claim 1, wherein a narrow passage provides the restricted communication between the combustion chamber and the compression chamber.

6. An engine as claimed in claim 5, wherein the passage is offset so that it enters the compression chamber in a substantially tangential direction.

7. An engine as claimed in claim 6, wherein the passage is arranged so that fuel enters the compression chamber in the same direction as the swirling movement of the air therein.

8. An engine as claimed in claim 1, wherein an external blower is provided to supply scavenging air at high pressure to the compression chamber.

9. An engine as claimed in claim 8, wherein the blower also supplies air for the fuel mixture to be injected into the combustion chamber.

10. An engine as claimed in claim 1, having a plurality of external combustion chambers spaced around the compression chamber and in communication therewith.

11. An engine as claimed in claim 1, wherein injection of a rich fuel/air mixture into the combustion chamber takes place just before the exhaust ports are closed by movement of a piston.

* * * * *